(12) United States Patent
Wang et al.

(10) Patent No.: US 10,721,415 B2
(45) Date of Patent: Jul. 21, 2020

(54) IMAGE PROCESSING SYSTEM WITH LED FLICKER MITIGATION

(71) Applicant: Futurewei Technologies, Inc., Plano, TX (US)

(72) Inventors: Nien-Tsu Wang, Los Gatos, CA (US); Wenting Li, Shenzhen (CN); Jilin Yang, Shenzhen (CN)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 16/130,171

(22) Filed: Sep. 13, 2018

(65) Prior Publication Data

US 2020/0092458 A1  Mar. 19, 2020

(51) Int. Cl.
*H04N 5/235* (2006.01)
*H04N 5/265* (2006.01)

(52) U.S. Cl.
CPC ......... *H04N 5/2357* (2013.01); *H04N 5/2355* (2013.01); *H04N 5/265* (2013.01)

(58) Field of Classification Search
CPC .................................................. H04N 5/2357
USPC ...................................................... 348/226.1
See application file for complete search history.

(56) References Cited

U.S. PATENT DOCUMENTS

| 9,544,505 | B2 * | 1/2017 | Tsuzuki | ............. | H04N 5/23254 |
| 2014/0153839 | A1 * | 6/2014 | Tsuzuki | ............... | H04N 5/2355 |
| | | | | | 382/254 |
| 2014/0198226 | A1 | 7/2014 | Lee | | |

FOREIGN PATENT DOCUMENTS

| CN | 105611187 A | 5/2016 |
| WO | 2018075690 A2 | 4/2018 |

OTHER PUBLICATIONS

International Search Report dated Aug. 29, 2019, in International Patent Application No. PCT/CN2019/093174, 10 pages.
Silsby et al., "A 1.2MP 1/3" CMOS Image Sensor with Light Flicker Mitigation," on Semiconductor, Apr. 2015, 4 pages.

* cited by examiner

*Primary Examiner* — Joel W Fosselman
(74) *Attorney, Agent, or Firm* — Vierra Magen Marcus LLP (57) ABSTRACT

The disclosure relates to technology for processing images to detect LED on pulses within the images. An image processing device and method includes a fusion processor and process configured to receive the sequential long and short exposure images and output a fusion image including added corresponding regions of adjacent sequential long and short exposure images. The image processing device and method also includes an LED detection processor and method configured to receive the fusion image, a WDR image and the sequential long and short exposure images and output a control signal indicating whether each corresponding region includes an LED flicker or motion. The image processing device and method also includes a blending processor and method responsive to the control signal to generate a blended image for the sequential long and short exposure images.

20 Claims, 8 Drawing Sheets

IMAGE PROCESSING SYSTEM WITH LED FLICKER MITIGATION

FIELD

The disclosure generally relates to image processing, and specifically an image processing pipeline which reduced LED flicker artifacts in an image stream.

BACKGROUND

In current imaging systems flickering lighting and objects with changing illumination in an image may result in missing parts of an object, or object distortion. In particular, light-emitting diode (LED) traffic signs (which can flicker several hundred times per second), and LED stop and head lights of modern cars, have been widely adopted for traffic control signs and vehicle components. However, these LEDs present detection issues for current image processing systems. Typically, image sensors acquire light asynchronously relative to the scenery being captured. This means that portions of an image may not be exposed for part of the frame duration. This is especially true for objects with illumination flickering when integration times are much shorter than the flicker periods. Zones in an image that are not fully exposed to dynamic scenery may result in object distortion, saturation data loss, and color artifacts.

Vehicle cameras are required to be able to capture images with a wide dynamic range (WDR) of light conditions, such as entering or exiting tunnels. Most of these cameras are equipped with a CMOS sensor with WDR technology. The concept of this WDR sensor is to capture an image by combining multiple exposure frames, with each exposure frame having different exposure duration. A WDR module composites images by selecting the short-exposure frames for the areas of movement, as well as oversaturated areas, within an input image, while the dark areas, as well as non-moving areas (without brightness oversaturation) are synthesized by the long-exposure frames.

Short exposure times will sometimes cause the image sensor to miss the LED "on" pulse and then cause the image to have flickering artifacts, as shown in the following figure. This flickering issue not only affects the viewing experience but also may degrade the accuracy of judgement in a system like Advanced Driver Assistance System (ADAS).

BRIEF SUMMARY

According to one aspect of the present disclosure, there is provided an image processing device, including a fusion processor configured to receive sequential long and short exposure images, and to generate a fusion image including added corresponding portions of adjacent sequential long and short exposure images. The image processing device also includes an LED detection processor configured to receive the fusion image, the sequential long and short exposure images, and a wide dynamic range (WDR) image created from the sequential long and short exposure images, and to generate a control signal indicating whether the corresponding region includes an LED flicker or motion. The image processing device also includes a blending processor responsive to the control signal to generate a blended image.

Optionally, in any of the preceding aspects, the image processing device may be configured such that the fusion processor is configured to output the fusion image by adding pixel values from the adjacent long and short sequential images together. Optionally, in any of the preceding aspects, the image processing device may include a fusion processor adding pixel values on a pixel-by-pixel basis in corresponding regions of the adjacent long and short sequential images. Optionally, in any of the preceding aspects, the image processing device may include a fusion processor which includes a saturation checking mechanism operating on a pixel-by-pixel basis. Optionally, in any of the preceding aspects, the image processing device may include a blending processor which selects a pixel value for a blended image from a corresponding pixel value in the fusion image, or in the WDR image, or by blending of the fusion and WDR images based on the control signal. Optionally, in any of the preceding aspects, the image processing device may include an LED detection processor configured to determine whether at least a corresponding region of two adjacent sequential long and short exposure images, the fusion image, and the WDR image includes motion or an LED flicker based on the relationship between pixel values in the adjacent sequential long and short images. Optionally, in any of the preceding aspects, the blended image is either from the WDR image, from the fusion image, or from the blending of the WDR and the fusion images.

One general aspect includes the image processing device where the blended image includes an image showing an LED light source during a long exposure image from an image capture device which captures and outputs the sequential long and short exposure images.

According to one other aspect of the present disclosure, there is provided a computer-implemented method for processing images, including: receiving sequential long and short exposure images and a wide dynamic range (WDR) image based on adjacent sequential long and short exposure images. The computer-implemented method also includes generating a fusion image based on the adjacent sequential long and short exposure images, this fusion image including added data from each of the adjacent long and short exposure images. The computer-implemented method also includes generating a control signal based on the fusion image, the WDR image, and the adjacent sequential long and short exposure images, this control signal indicating whether pixels in the fusion image or the WDR image include an LED flicker. The computer-implemented method also includes generating a blended image responsive to the control signal.

Optionally, in any of the preceding aspects, the computer-implemented method includes generating a fusion image that includes adding together pixel values from the adjacent long and short sequential images. Optionally, in any of the preceding aspects, the computer-implemented method includes generating a fusion image generated by adding pixel values on a pixel-by-pixel basis in corresponding regions of the adjacent long and short sequential images. Optionally, in any of the preceding aspects, the computer-implemented method includes generating a fusion image that includes limiting pixel saturation on a pixel-by-pixel basis. Optionally, in any of the preceding aspects, the computer-implemented method includes generating a blended image that includes selecting a pixel value for the blended image from one of a corresponding pixel value in the fusion image, or from the WDR image, or from both of a corresponding pixel value in the fusion image and in the WDR image based on the control signal. Optionally, in any of the preceding aspects, the computer-implemented method includes generating a control signal determining whether at least a corresponding region of two adjacent sequential long and short exposure images, the fusion image, and the WDR image includes motion or an LED flicker. Optionally, in any of the preceding aspects, the computer-implemented method includes generating a blended image that includes determining whether a region in the WDR image, the fusion image or the blended image is oversaturated and correcting the oversaturated region.

According to still one other aspect of the present disclosure, there is provided a non-transitory computer-readable medium storing computer instructions for processing images, that when executed by one or more processors, causes the one or more processors to perform the steps of: receiving sequential long and short exposure images from an image sensor; generating a wide dynamic range (WDR) image based on adjacent sequential long and short exposure images; generating a fusion image based on the adjacent sequential long and short exposure images, the fusion image including added data from each of the adjacent long and short exposure images, and generating a control signal based on the fusion image, the WDR image and the adjacent sequential long and short exposure images, the control signal indicating whether pixels in the fusion image or the WDR image include an LED flicker. The non-transitory computer-readable medium also includes generating a blended image responsive to the control signal by selecting data from one of the WDR image, or the fusion image, or the blended combination.

Optionally, in any of the preceding aspects, the non-transitory computer-readable medium includes generating a fusion image that includes adding together pixel values from the adjacent long and short sequential images on a pixel-by-pixel basis in corresponding regions of the adjacent long and short sequential images. Optionally, in any of the preceding aspects, the non-transitory computer-readable medium includes generating a fusion image that includes limiting pixel saturation on a pixel-by-pixel basis. Optionally, in any of the preceding aspects, the non-transitory computer-readable medium includes generating a control signal determines whether at least a corresponding region of two adjacent sequential long and short exposure images, the fusion image, and the WDR image includes motion or an LED flicker. Optionally, in any of the preceding aspects, the non-transitory computer-readable medium includes generating a blended image includes determining whether a region in the WDR image, the fusion image or the blended image is oversaturated and correcting the oversaturated region.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

Aspects of the present disclosure are illustrated by way of example and are not limited by the accompanying figures for which like references indicate elements.

DETAILED DESCRIPTION

The present disclosure will now be described with reference to the figures, which in general relate to a novel image processing system which allows conventional CMOS image detectors to be utilized to detect environmental LED lighting while preventing the introduction of distortions and motion artifacts in the final produced image. The image processing system includes a wide dynamic range (WDR) processor or module, a fusion processor or module, a LED detection processor or module, and a blending processor or module. The system is configured to receive sequential long and short exposure images from an image sensor. The system uses a WDR image from the WDR processor and a fusion image from the fusion processor in conjunction with the sequential long and short exposure images to detect LED pulses having a different pulse duration from the image sensor producing the long and short exposure images. The LED detection processor outputs a control signal indicating whether the corresponding region in sequential long and short exposure images includes an LED flicker or motion, and the blending processor generates a blended image for the sequential long and short exposure images with a flicker-free final image.

It is understood that the present embodiments of the disclosure may be implemented in many different forms and that claims scopes should not be construed as being limited to the embodiments set forth herein. Rather, these embodiments are provided so that this disclosure will be thorough and complete and will fully convey the inventive embodiment concepts to those skilled in the art. Indeed, the disclosure is intended to cover alternatives, modifications and equivalents of these embodiments, which are included within the scope and spirit of the disclosure as defined by the appended claims. Furthermore, in the following detailed description of the present embodiments of the disclosure, numerous specific details are set forth in order to provide a thorough understanding. However, it will be clear to those of ordinary skill in the art that the present embodiments of the disclosure may be practiced without such specific details.

Figure 1:
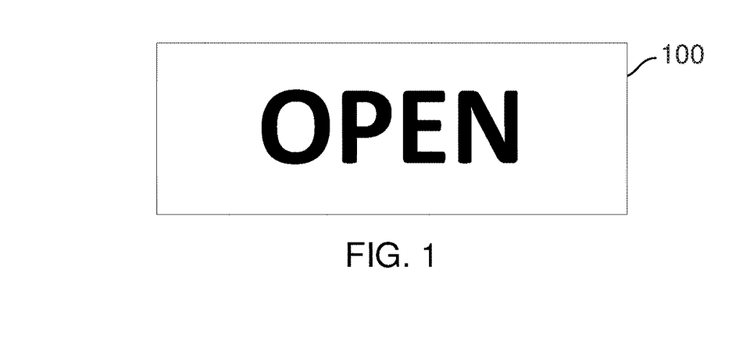
FIG. 1 illustrates an LED sign in which all LED components are visible.
Figure 3:
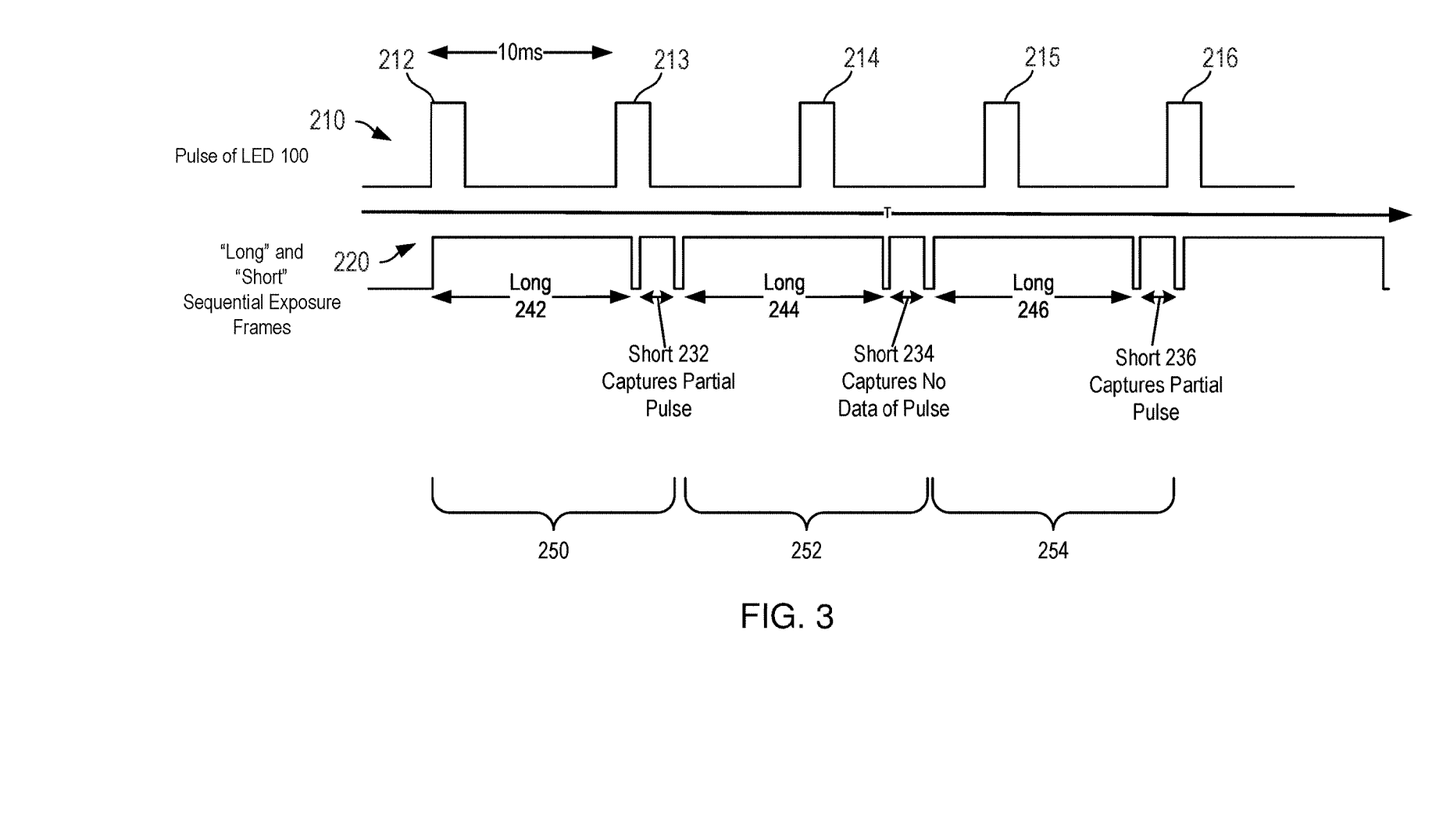
FIG. 3 is a timing diagram illustrating the output timing of a multiple exposure image sensor.

FIG. 1 illustrates an LED sign 100 showing the word "OPEN" wherein the sign is made up of a plurality of LED lights. As illustrated in FIG. 3, each LED making up the word OPEN has a series of ON pulses recurring at 10 ms intervals. The ON pulses are undetectable to the human eye, but can be detected by imaging systems. As Illustrated in FIG. 3, wide dynamic range (WDR) systems using CMOS sensors capture an image by combining multiple exposure frames, with each exposure frame having different exposure duration. FIG. 3 illustrates the long and short sequential exposure frame timing at 220. In the context of this disclosure, the term "frame" is used synonymously with the term "image" as a frame may comprise one of many still images which compose the complete moving picture.

Figure 2:
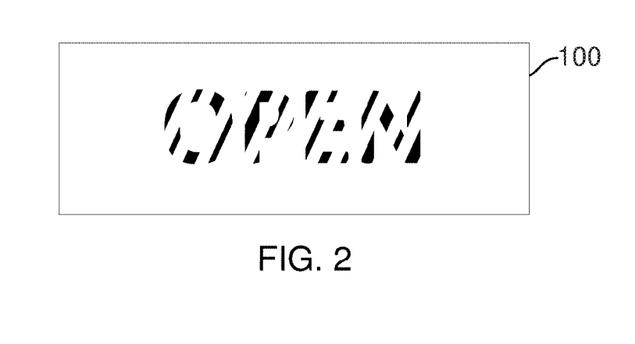
FIG. 2 illustrates the LED sign of FIG. 1 in which all LED components are not visible as a result of faulty imaging.

As a result of the exposure timing between long and short exposure frames, an imaging system may miss the exposure pulse of an LED sign, resulting in the image appearing as illustrated in FIG. 2: a partial or fully, underexposed image.

As illustrated in FIG. 3, the timing disparity between an image capture sensor adapted to output sequential long and short exposure images and an LED "on" pulse is illustrated. Timing graph 210 illustrates sequential, periodic pulses of an LED. In one embodiment, the LED on pulse repeats every 10 ms, but the period may be longer or shorter depending on the LED manufacturer and the use of the LED. An image capture sensor captures long exposures (242, 244, 246) and short exposures (232, 234, 236) in sequence. During a first capture sequence 250 comprising long exposure 242 and short exposure 232, the short exposure 232 will capture partial exposure data of a corresponding LED pulse 213, while the long exposure 242 will capture data from pulse 212 and 213. During a second capture sequence 252 comprising long exposure 244 and short exposure 234, the short exposure 234 will capture no exposure data of a LED pulses 214 or 215, while the long exposure 244 will capture a full exposure of data from pulse 214. During a third capture sequence 254 comprising long exposure 246 and short exposure 244, the short exposure 236 will again only capture a partial exposure data of a corresponding LED pulse 216, while the long exposure 244 will capture a full exposure of data from pulse 215.

The detected image of a conventional WDR sensor is composited from the short-exposure frames in areas of movement, as well as oversaturated areas. On the other hand, the dark areas, as well as non-moving areas (without brightness oversaturation), an image may be synthesized by the long-exposure frames. This results in the sign 100 appearing as illustrated in FIG. 2.

Figure 4:
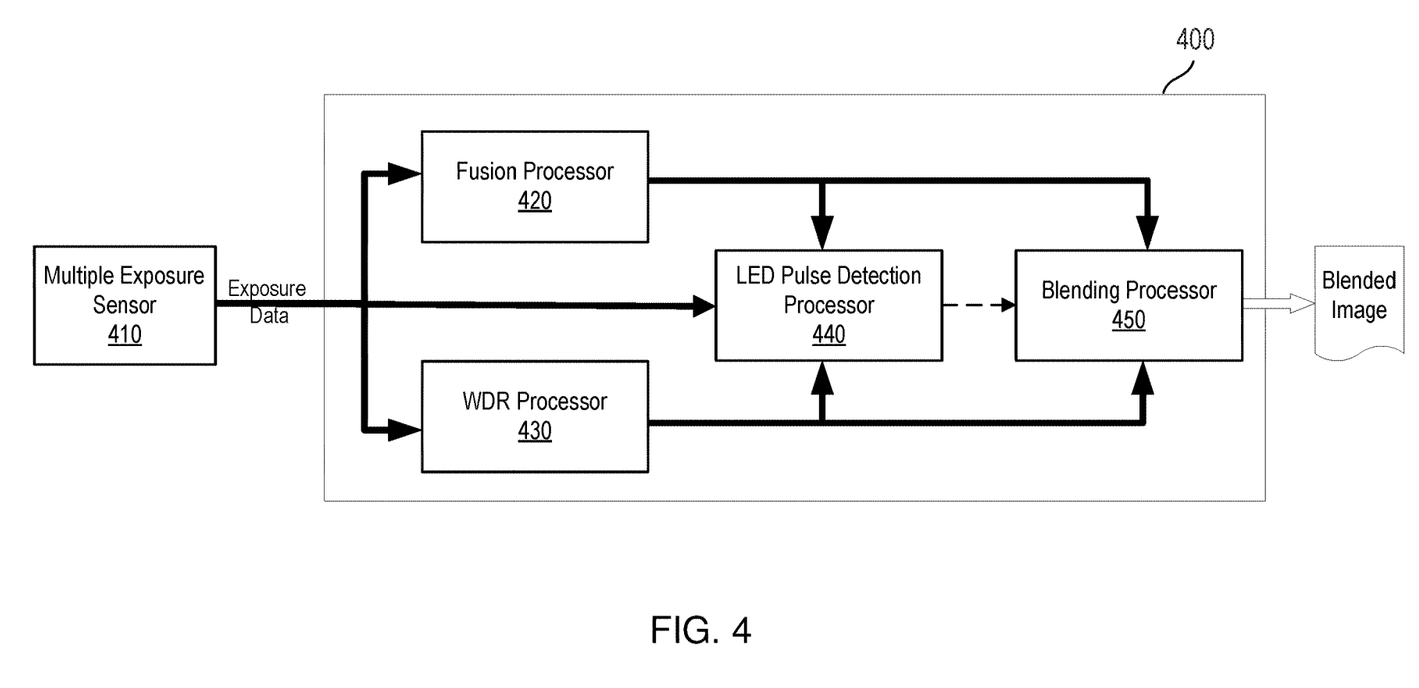
FIG. 4 is a block diagram of an image processing system.

FIG. 4 illustrates an image signal processor (ISP) in accordance with the present technology. The ISP 400 is coupled to a multiple exposure sensor 410 and includes a fusion processor 420, a WDR processor 430, an LED pulse detection processor 440 and a blending processor 450. The multiple exposure sensor 410 provides sequential long and short exposure images or frames. The exposure data output from the multiple exposure sensor 410 is provided to the fusion processor 420, WDR processor 430 and the LED pulse detection processor 440.

The fusion processor 420 adds multiple exposure data from sequential long and short images together. The addition of multiple exposure data together is performed on a pixel-by-pixel basis over corresponding regions of pixels in adjacent long and short images. In one aspect, a region may be an area of pixels in a frame. Regions may be defined by a number of pixels in width by a number of pixels in height. In one embodiment, a region may comprise an area comprising a 30 pixels wide by 5 pixels high area. Pixels are arranged within a frame in a series of rows and columns, and hence a region may have the same corresponding regions in adjacent frames (next sequential long or short frame) positioned at the same row and column area in the adjacent frames. In one embodiment, the fusion processor 420 may include a saturation checking mechanism to limit final output pixel value to avoid oversaturation in bright exposure regions. In an alternative embodiment, no oversaturation mechanism is used in the fusion processor and oversaturation processing may occur in the blending processor 450.

The output of the fusion processor 420 comprises a fusion image which is provided to the LED pulse detection processor 440 and the blending processor 450.

The WDR processor 430 outputs a wide dynamic rage image (WDR image). The WDR image is a clear, no motion-blur picture. In order to output the WDR image, the WDR processor 430 is configured to detect potential motion by comparing long exposure frames to short exposure frames. Therefore, it may recognize the on-off pulse of the LED as motion. When this occurs, the WDR processor 430 outputs the short-exposure frame and, as discussed above with respect to FIG. 3, the short-exposure frames often miss the "on" pulse of LED light. The WDR image is output to the LED pulse detection processor 440 and the blending processor 450. In one embodiment, the WDR processor 420 may include a saturation checking mechanism to avoid oversaturation in bright exposure regions of the WDR image. In an alternative embodiment, no oversaturation mechanism is used in the WDR processor 430 and oversaturation processing may occur in the blending processor 450.

The LED pulse detection processor 440 determines whether a region within input images is in an LED flickering area or not. Because areas of movement can appear similar to LED flickering, the LED detector determines whether a raw exposure input includes a true moving area or an LED flickering. If that determination is incorrect, it will cause motion blur or motion discontinuity artifacts in an output image. The LED pulse detection processor 440 uses the raw exposure data from the multiple exposure sensor 410, the fusion image from the fusion processor 420 and the WDR image from the WDR processor 430 to make this determination as to whether a region is an LED pulse or motion. As described below, the LED pulse detection processor 440 outputs a control signal to the blending processor 450 which instructs the blending processor 450 how to process the region in a final blended image.

The blending processor 450 creates and outputs a blended image, comprising a synthesis of the fusion image and the WDR image. The blended image provides is the blended result of a WDR image and the fusion image according to the information from the LED pulse detection processor 440. The blended image is a more accurate representation of the area imaged when the area includes an LED source. As noted above, in embodiments where the WDR processor 430 and fusion processor 420 do not include an oversaturation mechanism controlling oversaturation in their respective output images, the blending processor 450 may include an oversaturation mechanism.

Each of the processors illustrated in FIG. 4 may comprise circuitry specifically constructed to perform the functions described herein. Each processor may likewise comprise any suitable programmable hardware element such as programmable processing circuitry. Each processor may be provided as a separate circuit element to other processors or the processors may share some or all of their processing circuitry. Each of the aforementioned processors may be coupled by one or more system busses functionally illustrated by the arrows linking the data between the various processors. The arrows indicating data flow are not to be considered indicative of the number of placement of data or control busses between the processors but merely illustrative of data flow between the processors.

Figure 5:
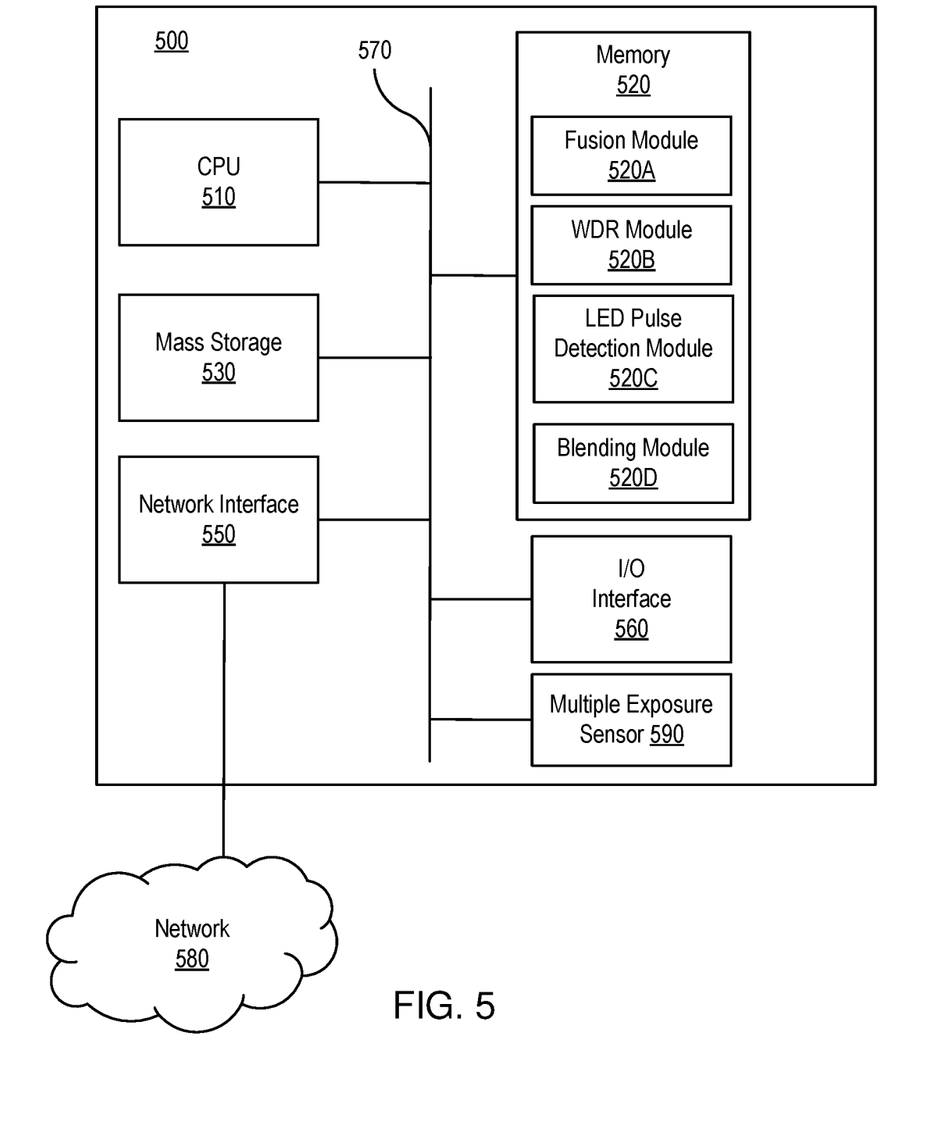
FIG. 5 illustrates a block diagram of a network system that can be used to implement various embodiments.

FIG. 5 is a block diagram of a network device 500 that can be used to implement various embodiments. Specific network devices may utilize all of the components shown, or only a subset of the components, and levels of integration may vary from device to device. Furthermore, the network device 500 may contain multiple instances of a component, such as multiple processing units, processors, memories, transmitters, receivers, etc. The network device 500 may include a central processing unit (CPU) 510, a memory 520, a mass storage device 530, and an I/O interface 560 connected to a bus 570. The bus 570 may be one or more of any type of several bus architectures including a memory bus or memory controller, a peripheral bus or the like.

A multiple exposure sensor 590 is coupled to bus 570 and may be equivalent to multiple image sensor 410 discussed with respect to FIG. 4. Sensor 590 is coupled to bus 570 and outputs sequential long and short exposure images to memory 520 which may be operated on by the CPU.

The CPU 510 may comprise any type of electronic data processor. The memory 520 may comprise any type of system memory such as static random access memory (SRAM), dynamic random access memory (DRAM), synchronous DRAM (SDRAM), read-only memory (ROM), a combination thereof, or the like. In an embodiment, the memory 520 may include ROM for use at boot-up, and DRAM for program and data storage for use while executing programs. In embodiments, the memory 520 is non-transitory. In one embodiment, the memory 520 includes a fusion module 520A which may comprise instructions to the CPU 510 to add multiple exposure data from sequential long and short pulses together and, optionally, instructions to implement a saturation checking mechanism to limit final output pixel values in the fusion image to avoid oversaturation in bright exposure regions. The memory 520 may further include a WDR module 520B which includes instructions to the CPU 510 to create and output a WDR image in a manner equivalent to the WDR processor 430. The memory 520 may further include an LED pulse detection module 520C comprising instructions to the CPU 510 to determine whether a corresponding region within input fusion images, WDR images and sequential long and short exposures from the exposure sensor 590 is in an LED flickering area or not, operating in a manner equivalent to the LED pulse detection processor 440. The memory 520 a blending module 520D includes instructions to the CPU 510 to create and outputs a blended image, comprising a synthesis of the fusion image and the WDR image, and provides a more accurate representation of whether an area or region within an image is an LED or not. The blending module 520D operates in a manner equivalent to the blending processor 450. The blending module 520D may optionally include instructions to implement a saturation checking mechanism to limit final output pixel values in the blended image to avoid oversaturation in bright exposure regions where such saturation checking is optionally not included in the WDR module 520B and/or the fusion module 520A.

The mass storage device 530 may comprise any type of storage device configured to store data, programs, and other information and to make the data, programs, and other information accessible via the bus 570. The mass storage device 530 may comprise, for example, one or more of a solid state drive, hard disk drive, a magnetic disk drive, an optical disk drive, or the like.

The network device 500 also includes one or more network interfaces 550, which may comprise wired links, such as an Ethernet cable or the like, and/or wireless links to access nodes or one or more networks 580. The network interface 550 allows the network device 500 to communicate with remote units via the networks 580. For example, the network interface 550 may provide wireless communication via one or more transmitters/transmit antennas and one or more receivers/receive antennas. In an embodiment, the network device 500 is coupled to a local-area network or a wide-area network 580 for data processing and communications with remote devices, such as other processing units, the Internet, remote storage facilities, or the like.

Figure 6:
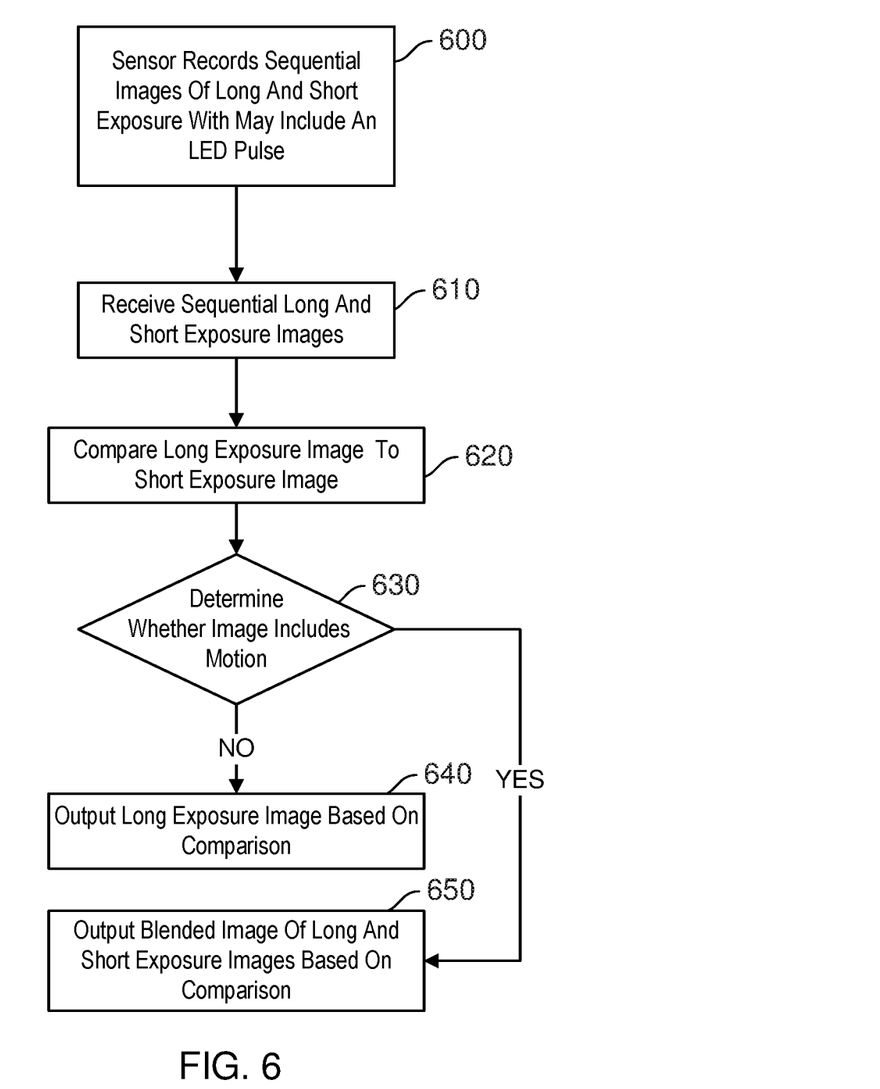
FIG. 6 is a flow diagram illustrating the functions of a WDR unit used in the image processing system.

FIG. 6 is a flowchart illustrating the processes performed by the WDR processor or the WDR module 520B in accordance with the technology. At 600, the image sensor 410 or 590 captures multiple sequential long and short images. It should be understood that the image sensor capture is not a part of the WDR processor and that the image sensor 410 or 590 may be any of a number of conventional CMOS technology based image sensors which are configured capture and output a plurality of sequential long and short exposure images.

At 610, the WDR processor 430 or WDR module 520B receives a stream of sequential long and short exposure images. At 620, the long exposure frame is compared to the short exposure frame. This comparison may occur on a region by region basis and for corresponding regions in sequential frames or multiple sequential (long and short) frames. At 630, a determination is made as to whether the image (or the region) includes motion. The determination may be the result of comparing exposure data in adjacent images and within regions to analyze whether similar exposure data in close pixels within a region appear in successive images. If so, then motion may be determined. If motion is determined at 630, then a blended WDR image comprising the long exposure and short exposure image is output as the WDR image at 650 based on the comparison at 630. If motion is not determined to be in the image, then a long exposure image as the WDR image is output at 640.

Figure 7:
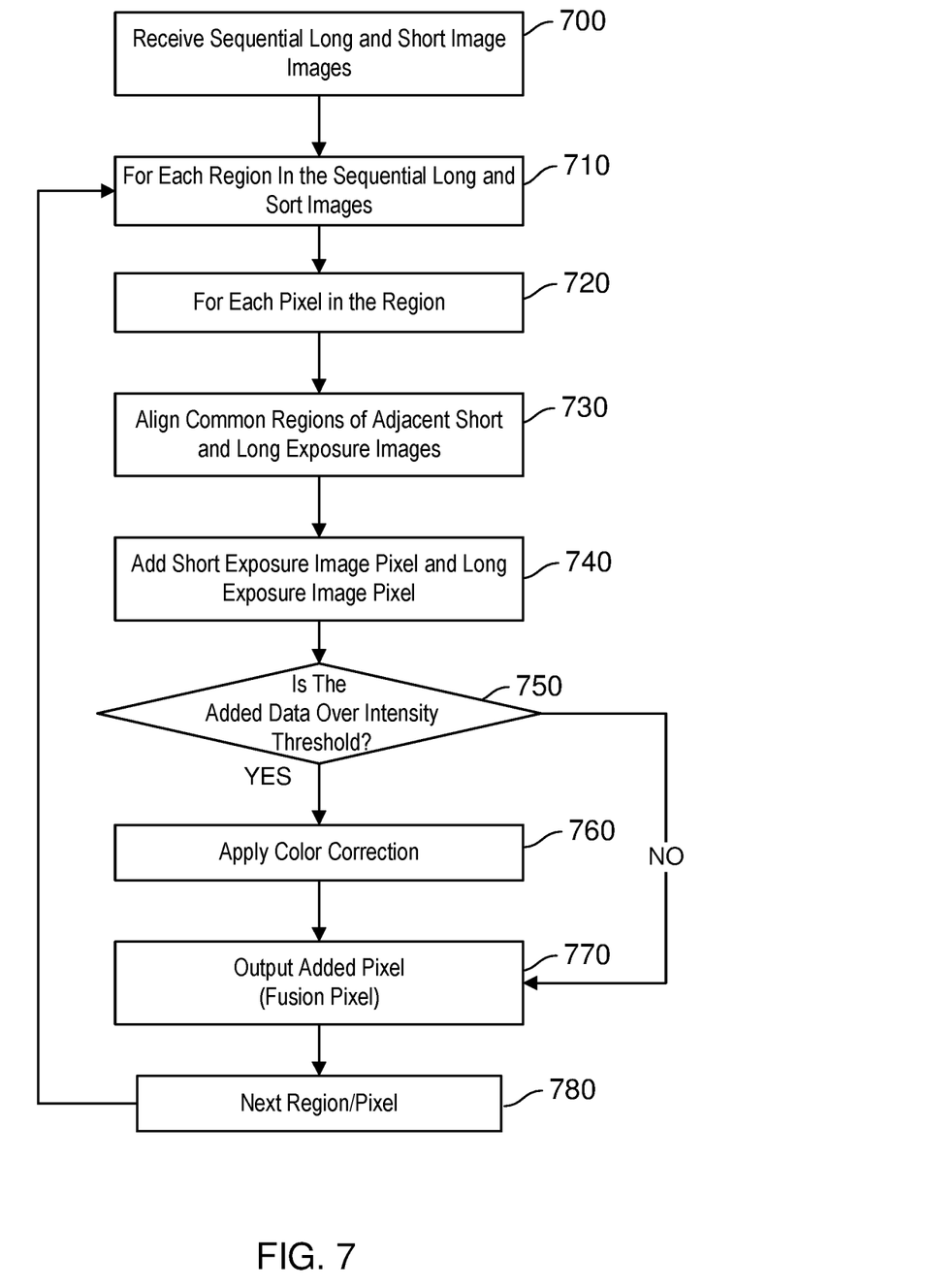
FIG. 7 is a flow diagram illustrating the functions of a fusion unit used in the image processing system.

FIG. 7 is a flowchart illustrating the process performed by the fusion processor 420 (or fusion module 520A). At 700, the fusion processor 420 or fusion module 520A receives a stream of sequential long and short exposure images. It should be understood that the time sequence of a stream of sequential long and short exposure images will be time-synced with the stream received by the WDR processor (or WDR module 430) and the LED detection processor 440 (or LED detection module 520C) so that all processors (or modules) operate on the same time-sequenced image(s) within the stream.

At 710, for each common region within two successive images and at 720 for each image within each common region, the steps at 730-770 are repeated to generate a fusion image. At 730, common regions in adjacent sequential short and long exposure images are aligned and determined. As noted, the common regions may be the same region relative to the image row and column positions in successive images or multiple successive images. The process may be performed two adjacent images or multiple successive images. At 740, pixel data in the short exposure image(s) is added to pixel data in the adjacent sequential long exposure image(s). If, at 750, the added data is over an intensity threshold, a saturation checking mechanism is used to apply color correction to an output image. If the added data in successive frames, when added, would be over an intensity threshold at 750, then color correction is applied at 760. The threshold may be set at any suitable level by a process designed so that oversaturation of the pixel/region does not occur. Color correction at 760 may comprise applying a multiplier factor to the intensity data to reduce the intensity of the data coming from one or more of the long exposure image or short exposure image which will contribute to the fusion image. At 770, the added pixel data (or color corrected data) are output and the process moved so the next pixel and next region until all regions in the images are processed. Once all regions are processed at 780, the whole fusion image is generated.

Figure 8:
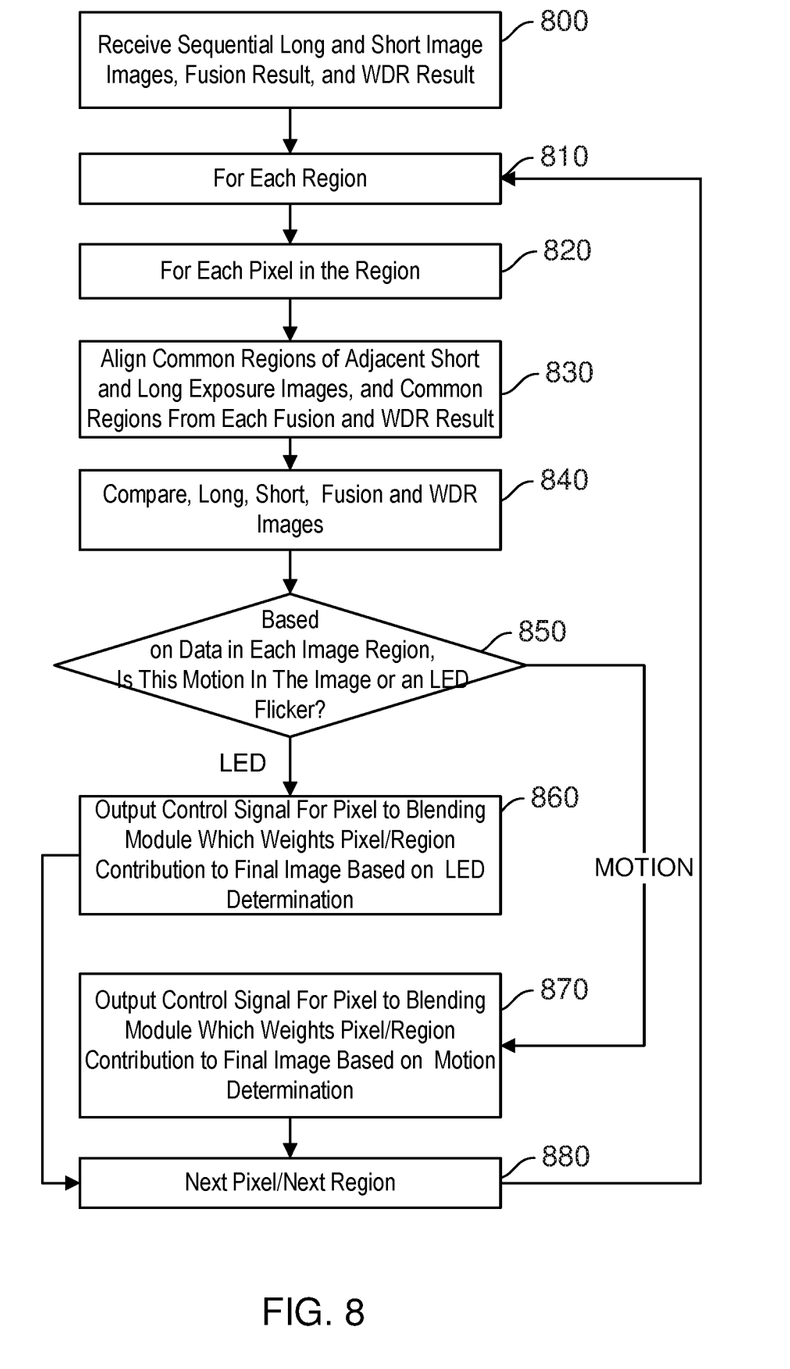
FIG. 8 is a flow diagram illustrating the function of an LED detection unit.

FIG. 8 is a flowchart illustrating the process performed by the LED pulse detection processor 440 or LED pulse detection module 520C. At 800, the LED pulse detection processor 440 or LED pulse detection module 520C receives a stream of sequential long and short exposure images. Again, the stream of sequential long and short exposure images will be time-synced with the fusion image and the WDR image when received by the LED pulse detection processor 440 or LED pulse detection module 520C.

At 810, for each common region within two successive images and at 820 for each image within each common region, the steps at 830-870 are repeated to generate a control signal to the blending processor 450 or blending module 520D which instructs the blending processor 450 or blending module 520D on how to process a blended image. At 830, common regions in adjacent sequential short and long exposure images are aligned and determined as in step 730.

Figure 9:
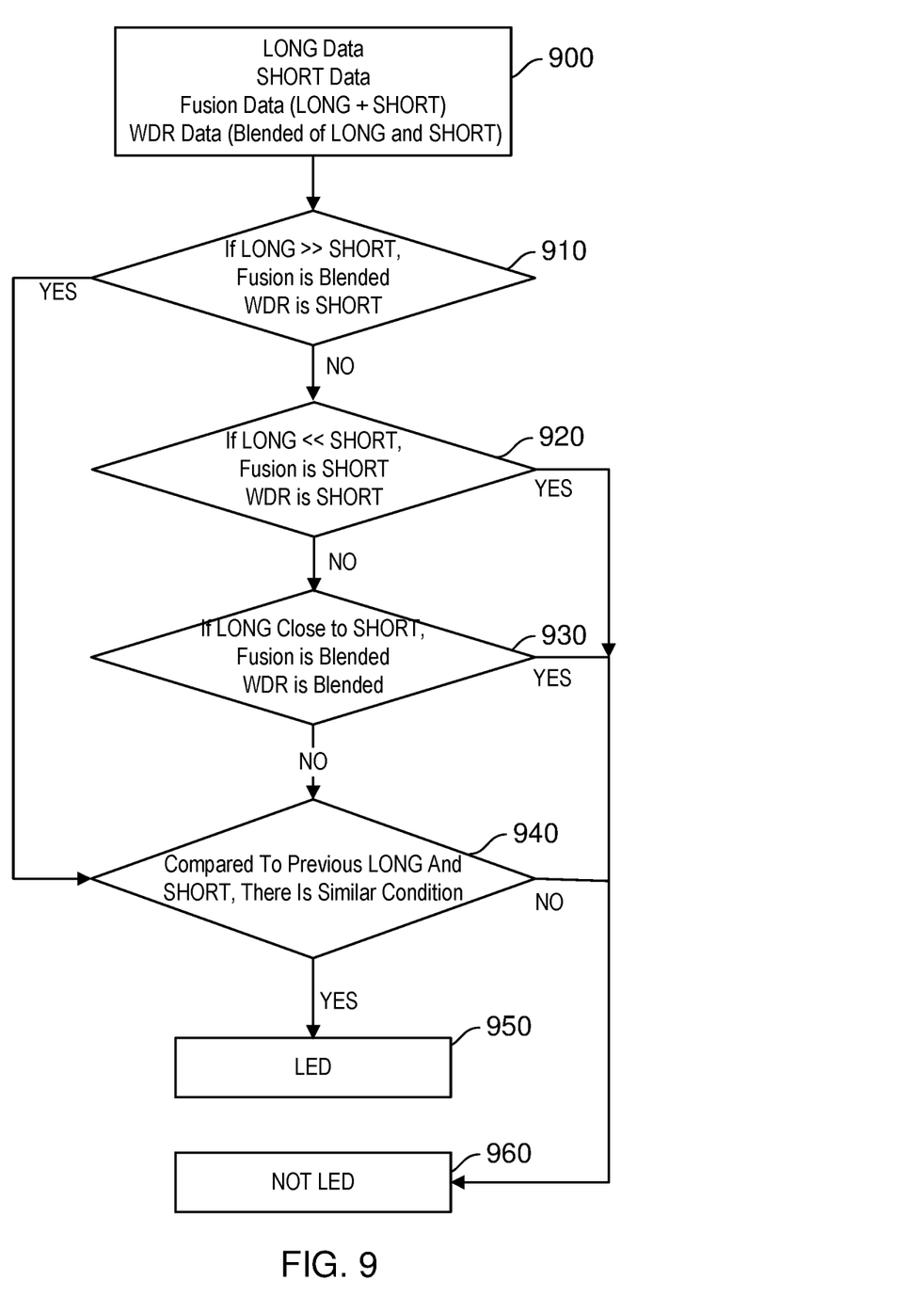
FIG. 9 is a flow diagram illustrating the function of a blending unit used in the image processing system.

At 840, pixel data in the short exposure image(s), adjacent sequential long exposure image(s), the fusion image and the WDR image are compared. At 850, based on data in each corresponding region and each pixel, a determination is made as to whether the pixel/region contains motion or an LED pulse. Additional details on step 850 are illustrated in FIG. 9. If the pixel in the corresponding region is determined to be an LED, at 860 a control signal is output (for each determined pixel) that weights the pixel contribution to the final frame based on the LED determination. Intensity data from a respective fusion or WDR image reflecting this output would then be used in the blended image. (Generally, this would likely be the higher intensity contribution of the greater of the fusion image or the WDR image to that pixel/region in the corresponding region of the blended image.) If the pixel in the corresponding region is determined to be motion, at 870 a control signal is output (for each determined pixel) that weights the pixel contribution to the final frame based on the motion determination. At 880, the process continues for each pixel and region in the image.

FIG. 9 is a flowchart illustrating one embodiment of performing step 850—determining whether an image includes motion or and LED pulse—in FIG. 8. At 900, the process takes as input the data from a long exposure image (LONG), a short exposure image (SHORT) (adjacent in time to the long exposure image), the fusion image data which may be an addition of the LONG data and the SHORT data or a color corrected output for the LONG and SHORT data, and the WDR image data (which is one of following: the LONG image data, the SHORT image data, or the blended of the LONG and SHORT image data). An LED's pulse frequency range is very wide and, LEDs in the field are likely to have many LEDs with different frequencies in an image. When there is an LED flickering, the difference between long exposure pixel value and short exposure pixel value is very large ($LONG_t \gg SHORT_t$). For a moving object, the relationship of previous pair of $LONG_{t-1}$ and $SHORT_{t-1}$ will be ($LONG_{t-1} \approx SHORT_{t-1}$). However, for a true LED flickering, the previous pair of $LONG_{t-1}$ and $SHORT_{t-1}$ will still be ($LONG_{t-1} \gg SHORT_{t-1}$).

One case is shown to determine whether an analysis needs to be performed (step 910) or whether, based on the data, an LED pulse can be determined (step 920 or 930).

An analysis is made at 940 if step 910 is true, or 920 and 930 are false. At 910, the LONG image data is much higher in intensity than the SHORT image data. In this case, the fusion image in this region will likely contain a color corrected (blended) set of data and the WDR image will likely contain the SHORT image data (having likely determined motion in the raw data). If step 910 is true, the process moves to step 940 where it is further determined if there is an LED pulse by comparing the conditions of previous LONG and SHORT images to the current LONG and SHORT images. If there is an LED pulse, the conditions of these two pairs of LONG and SHORT images will be similar.

At 920, the SHORT image data is much higher in intensity than the LONG image data. In this case, the fusion image in this region will likely contain the SHORT data and the WDR image will likely contain the SHORT image data (having likely determined no motion in the raw data). At 930, the LONG image data is close in intensity to the SHORT image data. In the case the fusion image in this region will likely contain the blended data and the image from the WDR will be blended data. If either 920 or 930 are true, then the method determines that no LED is present in the region.

The control signal output by the LED determination processor allows the blending processor to determine whether the WDR image data, or the fusion image data, or the blended of WDR and fusion images will be used for the output image. As described below, the blending processor chooses data from one of the WDR image or the fusion image on a pixel by pixel basis to generate the blended image. The blended image thus has an accurate detection of LED lighting within the image than standard WDR images while allowing the use of standard CMOS sensor technology.

Figure 10:
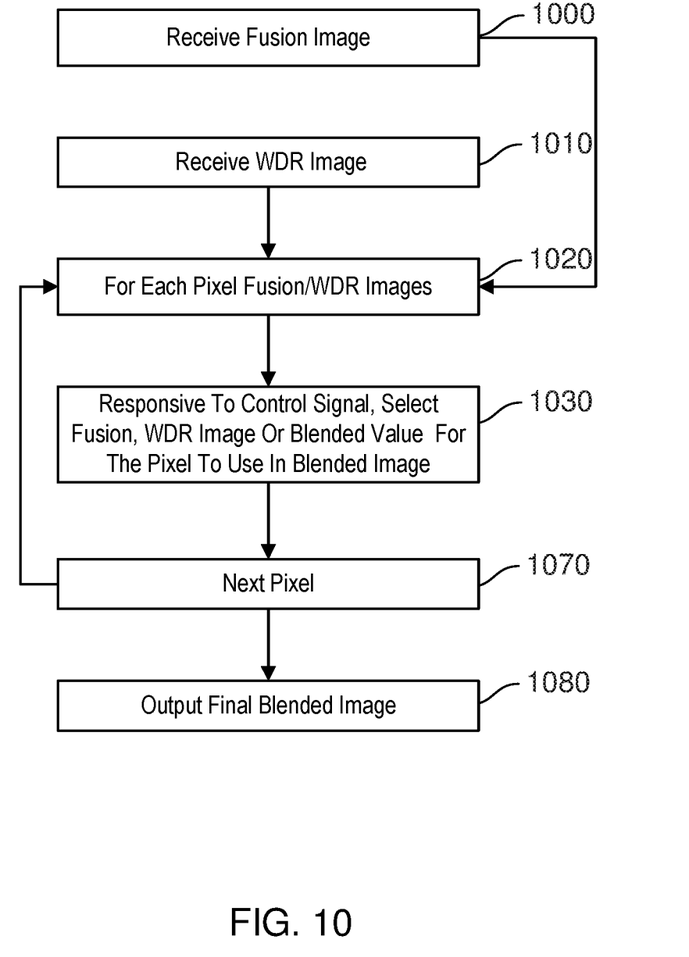
FIG. 10 is a flow diagram illustrating the process performed by a blending processor or blending module in accordance with the technology.

FIG. 10 illustrates the process performed by the blending processor 450 or blending module 520D. The blending processor 450 or blending module 520D takes as input the fusion image at 1000 and the WDR image at 1010. For each pixel in each of the fusion image and the WDR image at 1020, at 1030 and responsive to the control signal from the LED detection processor, the blending processor 450 or blending module 520D selects the pixel value of the fusion image or the WDR image or a blended version of the two images for use in the blended image. The process continues for each pixel at 1070 until all pixels have been processed, at which point the process outputs the final blended image with improved LED detection at 1080. As such, the blending processor or 450 or blending module 520D will output one of the following images: the WDR image, the fusion image, or the blended of WDR and fusion images. If the LED detection processor 440 or module 520C can determine that a pixel is in LED flickering area, the blending processor 450 or blending module 520D will output the fusion result for that pixel. On the other hand, if the LED detection processor 440 or module 520C can determine that a pixel is in a motion area, the blending processor 450 or blending module 520D will output the WDR result for that pixel. However, if a pixel cannot be certainly determined either in an LED flickering area or in a motion area, the blending processor 450 or blending module 520D will output the blended result of WDR and fusion images for that pixel. The operation of all modules is pixel based. To increase accuracy, the detection operation will also reference the surrounding pixels of a target pixel, it will be region based.

The technology may further include a means 400 for receiving sequential long and short exposure images output from an image sensor 410; a means 430 for generating a wide dynamic range (WDR) image based on adjacent sequential long and short exposure images; a means 420 for generating a fusion image based on the adjacent sequential long and short exposure images, the fusion image comprising added data from each of the adjacent long and short exposure images; a means 440 for generating a control signal based on the fusion image, the WDR image and the adjacent sequential long and short exposure images, the control signal indicating whether pixels in the fusion image or the WDR image comprise LED pulses; and a means 450 for generating a blended image responsive to the control signal by selecting data from one of the WDR image or the fusion image.

As noted above, the image processing technology discussed herein improves LED detection for a wide variety of applications. The technology allows conventional CMOS image sensors to be used with a WDR processor or module output while mitigating LED flicker in a final, blended image. Hence, manufacturing costs can be relatively low. In addition, compared to the conventional LED capture and detection processes, the technology can also improve the picture quality from the perspective of signal to noise ratio (SNR). The output of a WDR processor or module as discussed herein is a WDR image comprising a combination of LONG and SHORT exposure frames. The blending ratio for this WDR image depends on the difference of LONG and SHORT exposure data. For a pixel in a moving area, this difference will become larger and then the output pixel will include more SHORT exposure data. On the other hand, if a pixel is in a still and bright area, the difference will be smaller and then the output pixel will include more LONG exposure data. In general, the SHORT exposure data has less motion blur but is noisier than the LONG exposure data. When a detected pixel is in a still but darker area, the output of WDR module may include more SHORT exposure data because its corresponding SHORT exposure pixel is noisier and then the difference may become larger. In order to avoid such inaccurate detection, the LED pulse detection processor 440 or module 520C in can be used to check the relationship between the difference of previous pair (LONG$_{t-1}$, SHORT$_{t-1}$) and the difference of current pair (LONG$_t$, SHORT$_t$). If these two differences are similar, the detected pixel is in either LED flickering area or in still area, the blending module will output higher ratio of the fusion data in the final data. As mention above, the fusion image is the result of adding LONG and SHORT image data instead of only SHORT image data. Therefore, the SNR of the blended image will be better than the WDR image output in a noisy environment.

Disclosed herein is an image processing device comprising: a fusion processor configured to receive sequential long and short exposure images and generate a fusion image comprising added corresponding portions of adjacent sequential long and short exposure images; a LED detection processor configured to receive the fusion image, the sequential long and short exposure images, and a wide dynamic range (WDR) image created from the sequential long and short exposure images, and generate a control signal indicating whether the corresponding region includes LED flickers or motions; and a blending processor responsive to the control signal to generate a blended image.

The image processing device may include the aforementioned image processing device wherein the fusion processor is configured to output the fusion image by adding pixel values from the adjacent long and short sequential images together.

The image processing device may include any of the aforementioned image processing devices wherein the fusion processor adds pixel values on a pixel-by-pixel basis in corresponding regions of the adjacent long and short sequential images.

The image processing device may include any of the aforementioned image processing devices wherein the fusion processor includes a saturation checking mechanism operating on a pixel-by-pixel basis.

The image processing device may include any of the aforementioned image processing devices wherein the blending processor selects a pixel value for a blended image from one of a corresponding pixel value in the fusion image, or the WDR image or a combination of the fusion image and the WDR image based on the control signal.

The image processing device may include any of the aforementioned image processing devices wherein the LED detection processor is configured to determine whether at least a corresponding region of two adjacent sequential LONG and SHORT exposure images, the fusion image, and the WDR image includes motion or an LED pulse based on the relationship between pixel values in the adjacent sequential LONG and SHORT images.

The image processing device may include any of the aforementioned image processing devices wherein one of a WDR processor, the fusion processor and the blending processor determines whether a region is oversaturated and corrects the oversaturated region.

The image processing device may include any of the aforementioned image processing devices wherein the blending image comprises an image showing an LED during a long exposure image of an image capture device which captures and outputs the sequential long and short sequential exposure images.

Also disclosed is a computer-implemented method for processing images, comprising: receiving sequential long and short exposure images and a wide dynamic range (WDR) image based on adjacent sequential long and short exposure images; generating a fusion image based on the adjacent sequential long and short exposure images, the fusion image comprising added data from each of the adjacent long and short exposure images; generating a control signal based on the fusion image, the WDR image and the adjacent sequential long and short exposure images, the control signal indicating whether pixels in the fusion image or the WDR image comprise an LED flicker; and generating a blended image responsive to the control signal by selecting data from one of the following: WDR image, or the fusion image, or both.

The computer-implemented method may include any of the aforementioned computer implemented methods wherein generating a fusion image comprises adding pixel values from the adjacent long and short sequential images together.

The computer-implemented method may include any of the aforementioned computer implemented methods wherein generating a fusion image comprising adding pixel values on a pixel-by-pixel basis in corresponding regions of the adjacent long and short sequential images.

The computer-implemented method may include any of the aforementioned computer implemented methods wherein generating a fusion image includes limiting pixel saturation on a pixel-by-pixel basis.

The computer-implemented method may include any of the aforementioned computer implemented methods wherein generating a blended image includes selecting a pixel value for the blended image from one of a corresponding pixel value in the fusion image or the WDR image or a combination of the fusion image and the WDR image based on the control signal.

The computer-implemented method may include any of the aforementioned computer implemented methods which generates a control signal to determine whether at least a corresponding region of two adjacent sequential long and short exposure images, the fusion image, and the WDR image includes motion or an LED flickering based on the relationship between pixel values in the adjacent sequential LONG and SHORT images.

The computer-implemented method may include any of the aforementioned computer implemented methods wherein generating a blended image includes determining whether a region in the WDR image, the fusion image or the blended image is oversaturated correcting the oversaturated region.

Also disclosed is a non-transitory computer-readable medium storing computer instructions for processing images, that when executed by one or more processors, cause the one or more processors to perform the steps of: receiving sequential long and short exposure images and a wide dynamic range (WDR) image based on adjacent sequential long and short exposure images; generating a fusion image based on the adjacent sequential long and short exposure images, the fusion image comprising added data from each of the adjacent long and short exposure images; generating a control signal based on the fusion image, the WDR image and the adjacent sequential long and short exposure images, the control signal indicating whether pixels in the fusion image or the WDR image comprise LED flickering; and generating a blended image responsive to the control signal by selecting data from one of the WDR image or the fusion image.

The non-transitory computer-readable medium may include any of the aforementioned non-transitory computer-readable mediums wherein generating a fusion image comprises adding pixel values from the adjacent long and short sequential images together on a pixel-by-pixel basis in corresponding regions of the adjacent long and short sequential images.

The non-transitory computer-readable medium may include any of the aforementioned non-transitory computer-readable mediums wherein generating a fusion image includes limiting pixel saturation on a pixel-by-pixel basis.

The non-transitory computer-readable medium may include any of the aforementioned non-transitory computer-readable mediums wherein the generating a control signal based on the fusion image determines whether at least a corresponding region of two adjacent sequential long and short exposure images, the fusion image, and the WDR image includes motion or an LED on pulse based on the difference between the previous pairs of LONG and SHORT images and the current pairs of LONG and SHORT images.

The non-transitory computer-readable medium may include any of the aforementioned non-transitory computer-readable mediums wherein the generating a blended image includes determining whether a region in the WDR image, the fusion image or the blended image is oversaturated and correcting the oversaturated region.

It is understood that the present subject matter may be embodied in many different forms and should not be construed as being limited to the embodiments set forth herein. Rather, these embodiments are provided so that this subject matter will be thorough and complete and will fully convey the disclosure to those skilled in the art. Indeed, the subject matter is intended to cover alternatives, modifications and equivalents of these embodiments, which are included within the scope and spirit of the subject matter as defined by the appended claims. Furthermore, in the following detailed description of the present subject matter, numerous specific details are set forth in order to provide a thorough understanding of the present subject matter. However, it will be clear to those of ordinary skill in the art that the present subject matter may be practiced without such specific details.

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

The computer-readable non-transitory media includes all types of computer readable media, including magnetic storage media, optical storage media, and solid state storage media and specifically excludes signals. It should be understood that the software can be installed in and sold with the device. Alternatively the software can be obtained and loaded into the device, including obtaining the software via a disc medium or from any manner of network or distribution system, including, for example, from a server owned by the software creator or from a server not owned but used by the software creator. The software can be stored on a server for distribution over the Internet, for example.

Computer-readable storage media (medium) exclude (excludes) propagated signals per se, can be accessed by a computer and/or processor(s), and include volatile and non-volatile internal and/or external media that is removable and/or non-removable. For the computer, the various types of storage media accommodate the storage of data in any suitable digital format. It should be appreciated by those skilled in the art that other types of computer readable medium can be employed such as zip drives, solid state drives, magnetic tape, flash memory cards, flash drives, cartridges, and the like, for storing computer executable instructions for performing the novel methods (acts) of the disclosed architecture.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

For purposes of this document, each process associated with the disclosed technology may be performed continuously and by one or more computing devices. Each step in a process may be performed by the same or different computing devices as those used in other steps, and each step need not necessarily be performed by a single computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An image processing device, comprising:
  a fusion processor configured to receive sequential long and short exposure images and generate a fusion image comprising added corresponding regions of adjacent sequential long and short exposure images;
  a LED detection processor configured to receive the fusion image, the sequential long and short exposure images and a wide dynamic range (WDR) image created from the sequential long and short exposure images, and generate a control signal indicating whether a corresponding region includes LED flickers or motion; and
  a blending processor responsive to the control signal to generate a blended image.

2. The image processing device of claim 1 wherein the fusion processor is configured to output the fusion image by adding pixel values from the adjacent long and short sequential images together.

3. The image processing device of claim 2 wherein the fusion processor adds pixel values on a pixel-by-pixel basis in corresponding regions of the adjacent long and short sequential images.

4. The image processing device of claim 3 wherein the fusion processor includes a saturation checking mechanism operating on a pixel-by-pixel basis.

5. The image processing device of claim 1 wherein the blending processor selects a pixel value for a blended image from one of a corresponding pixel value in the fusion image, the WDR image or a combination of the fusion image and the WDR image based on the control signal.

6. The image processing device of claim 1 wherein the LED detection processor is configured to determine whether at least a corresponding region of two adjacent sequential long and short exposure images, the fusion image, and the WDR image includes motion or an LED pulse based on a relationship between pixel values in the adjacent sequential long and short images.

7. The image processing device of claim 1 wherein one of a WDR processor, the fusion processor and the blending processor determines whether a region is oversaturated and corrects the oversaturated region.

8. The image processing device of claim 1 wherein the blended image comprises an image showing an LED during a long exposure image of an image capture device which captures and outputs the sequential long and short exposure images.

9. A computer-implemented method for processing images, comprising:
  receiving sequential long and short exposure images and a wide dynamic range (WDR) image based on adjacent sequential long and short exposure images;
  generating a fusion image based on the adjacent sequential long and short exposure images, the fusion image comprising added data from each of the adjacent long and short exposure images;
  generating a control signal based on the fusion image, the WDR image and the adjacent sequential long and short exposure images, the control signal indicating whether pixels in the fusion image or the WDR image comprise an LED flicker; and
  generating a blended image responsive to the control signal.

10. The computer-implemented method of claim 9 wherein generating a fusion image comprises adding pixel values from the adjacent long and short sequential images together.

11. The computer-implemented method of claim 10 wherein generating a fusion image comprising adding pixel values on a pixel-by-pixel basis in corresponding regions of the adjacent long and short sequential images.

12. The computer-implemented method of claim 10 wherein generating a fusion image includes limiting pixel saturation on a pixel-by-pixel basis.

13. The computer-implemented method of claim 9 wherein generating generating a blended image includes selecting a pixel value for the blended image from one of a corresponding pixel value in the fusion image, the WDR image, or a combination of the fusion image and the WDR image based on the control signal.

14. The computer-implemented method of claim 9 wherein generating a control signal based on the fusion image determines whether at least a corresponding region of two adjacent sequential long and short exposure images, the fusion image, and the WDR image includes motion or an LED flicker based on a relationship between pixel values in the adjacent sequential long and short images.

15. The computer-implemented method of claim 9 wherein generating a blended image includes determining whether a region in the WDR image, the fusion image or the blended image is oversaturated correcting any oversaturation.

16. A non-transitory computer-readable medium storing computer instructions for processing images, that when executed by one or more processors, cause the one or more processors to perform the steps of:
  receiving sequential long and short exposure images and a wide dynamic range (WDR) image based on adjacent sequential long and short exposure images;
  generating a fusion image based on the adjacent sequential long and short exposure images, the fusion image comprising added data from each of the adjacent long and short exposure images;
  generating a control signal based on the fusion image, the WDR image and the adjacent sequential long and short exposure images, the control signal indicating whether pixels in the fusion image or the WDR image comprise an LED flicker; and
  generating a blended image responsive to the control signal by selecting data from one of the WDR image or the fusion image.

17. The non-transitory computer-readable medium of claim 16 wherein generating a fusion image comprises adding pixel values from the adjacent long and short sequential images together on a pixel-by-pixel basis in corresponding regions of the adjacent long and short sequential images.

18. The non-transitory computer-readable medium of claim 17 wherein generating a fusion image includes limiting pixel saturation on a pixel-by-pixel basis.

19. The non-transitory computer-readable medium of claim 18 wherein the generating a control signal based on the fusion image determines whether at least a corresponding region of two adjacent sequential long and short exposure images, the fusion image, and the WDR image includes motion or an LED on pulse based on a relationship between pixel values the adjacent sequential long and short images.

20. The non-transitory computer-readable medium of claim 16 wherein the generating a blended image includes determining whether a region in the WDR image, the fusion image or the blended images is oversaturated and correcting any oversaturation.

* * * * *

UNITED STATES PATENT AND TRADEMARK OFFICE
CERTIFICATE OF CORRECTION

PATENT NO. : 10,721,415 B2
APPLICATION NO. : 16/130171
DATED : July 21, 2020
INVENTOR(S) : N. Wang et al.

Page 1 of 1

It is certified that error appears in the above-identified patent and that said Letters Patent is hereby corrected as shown below:

In the Claims

Column 16, Line 29, Claim 13, Line 2, please delete "generating" after wherein.

Signed and Sealed this
Twentieth Day of October, 2020

Andrei Iancu
*Director of the United States Patent and Trademark Office*